US009892329B2

(12) United States Patent
Morales Teraoka et al.

(10) Patent No.: US 9,892,329 B2
(45) Date of Patent: Feb. 13, 2018

(54) ANIMAL TYPE DETERMINATION DEVICE

(71) Applicant: TOYOTA JIDOSHA KABUSHIKI KAISHA, Toyota-shi, Aichi (JP)

(72) Inventors: Edgar Yoshio Morales Teraoka, Susono (JP); Shin Tanaka, Numazu (JP); Yoshitaka Oikawa, Toyota (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 15/215,014

(22) Filed: Jul. 20, 2016

(65) Prior Publication Data

US 2017/0024618 A1    Jan. 26, 2017

(30) Foreign Application Priority Data

Jul. 24, 2015   (JP) .................. 2015-146606

(51) Int. Cl.
| | |
|---|---|
| *G06K 9/00* | (2006.01) |
| *B60W 30/09* | (2012.01) |
| *B60W 50/14* | (2012.01) |
| *G06K 9/62* | (2006.01) |

(52) U.S. Cl.
CPC ......... *G06K 9/00805* (2013.01); *B60W 30/09* (2013.01); *B60W 50/14* (2013.01); *G06K 9/00362* (2013.01); *G06K 9/00818* (2013.01); *G06K 9/6202* (2013.01)

(58) Field of Classification Search
CPC ............. G06K 9/00805; G06K 9/6202; G06K 9/00818; G06K 9/00362; B60W 30/09; B60W 50/14

USPC .......................................... 382/110
See application file for complete search history.

(56) References Cited

U.S. PATENT DOCUMENTS

2016/0049076 A1*   2/2016   Waite ............... G08G 1/096783
340/905

FOREIGN PATENT DOCUMENTS

| | | |
|---|---|---|
| JP | 2007-249841 A | 9/2007 |
| JP | 2009-204570 A | 9/2009 |
| JP | 2010-198166 A | 9/2010 |
| JP | 2013-92992 A | 5/2013 |
| JP | 2014-93000 A | 5/2014 |
| JP | 2015-215749 A | 12/2015 |

* cited by examiner

*Primary Examiner* — Amandeep Saini
(74) *Attorney, Agent, or Firm* — Sughrue Mion, PLLC

(57) ABSTRACT

The animal type determination device configured to perform pattern recognition with respect to an image obtained by image-capturing a periphery of a vehicle using a plurality of pre-stored animal image patterns, and to determine the type of an animal in the image is provided. The animal type determination device is configured to recognize the type of a caution target animal indicated by an animal warning sign in the image captured by a camera, raise a determination priority of the animal image pattern corresponding to the type of the caution target animal in a case where the type of the caution target animal is recognized, and performs the pattern recognition of the animal image pattern in the order of the determination priority to determine the type of the animal in the image.

16 Claims, 6 Drawing Sheets

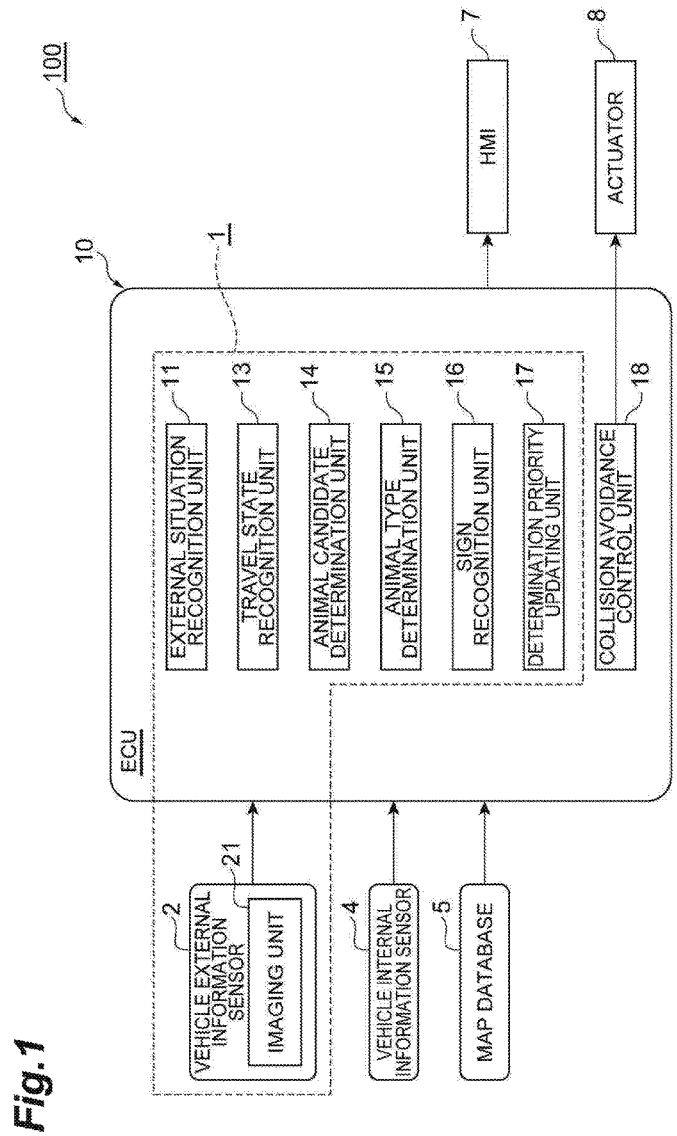

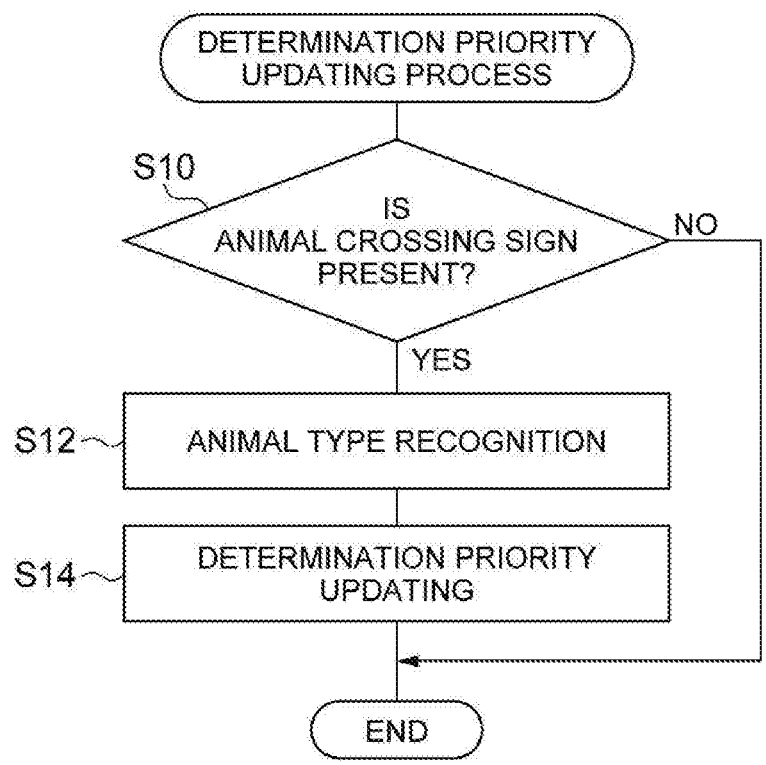

ANIMAL TYPE DETERMINATION DEVICE

CROSS-REFERENCE TO RELATED APPLICATIONS

This application claims priority from Japanese Patent Application No. JP 2015-146606, filed on Jul. 24, 2015, in the Japanese Patent Office, the disclosure of which is incorporated herein by reference in its entirety.

BACKGROUND

Technical Field

Apparatuses and methods consistent with the exemplary embodiments relate to an animal type determination device.

Description of the Related Art

In the related art, as a device that detects an animal in the periphery of a vehicle, a device disclosed in Japanese Unexamined Patent Publication No. 2013-092992 is known. The device disclosed therein detects a pedestrian and an animal from an image obtained by imaging the periphery of a vehicle, and performs a warning using the detected pedestrian or animal as a warning target. In this device, in a case where an animal warning sign indicating that there is a risk of animals jumping into traffic is detected on a roadside, even when both of a pedestrian and an animal are detected, the animal is preferentially determined as a warning target compared with the pedestrian.

SUMMARY

In the above-described device, animal type determination is not performed. Accordingly, in the above-described device, a warning based on the type of the animal cannot be performed. However, since there are various types of animals, for example, if pattern recognition is sequentially performed using patterns (templates) prepared for each type of animal, there is a possibility that rapid determination cannot be performed.

Thus, in this technical field, it is desirable to develop an animal type determination device capable of rapidly performing animal type determination.

That is, according to an aspect of an exemplary embodiment, there is provided an animal type determination device including: a camera configured to be mounted in a vehicle and to image-capture a periphery of the vehicle; and a controller configured to perform pattern recognition with respect to the image captured by the camera using a plurality of pre-stored animal image patterns and to determine a type of an animal in the image; recognize a type of a caution target animal indicated by an animal warning sign in the image captured by the camera; and raise, in response to the type of the caution target animal being recognized, a determination priority of an animal image pattern corresponding to the type of the caution target animal, in which the controller is further configured to perform the pattern recognition using the plurality of pre-stored animal image patterns in the order of the determination priority, and to determine the type of the animal in the image. According to this device, by raising a determination priority with respect to a caution target animal shown in an animal warning sign to perform pattern recognition, pattern recognition of an animal with a high possibility of being present in the periphery of a vehicle is performed at an early stage. Thus, it is possible to rapidly perform animal type determination.

According to another aspect of an exemplary embodiment, there is provided an animal type determination device including: a camera configured to be mounted in a vehicle and to image-capture a periphery of the vehicle; and a controller configured to perform pattern recognition with respect to the image captured by the camera using a plurality of pre-stored animal image patterns and to determine a type of an animal in the image; acquire position information of the vehicle; retrieve regional animal information corresponding to the position information of the vehicle from a memory, in which a caution target animal is associated with each of a plurality of predetermined regions; determine whether or not the caution target animal is set for a region where the vehicle is positioned based on the position information of the vehicle and the regional animal information; and raise, in response to determining that the caution target animal is set for the region where the vehicle is located, a determination priority of an animal image pattern corresponding to a type of the caution target animal, in which the controller is further configured to perform the pattern recognition using the plurality of pre-stored animal image patterns in the order of the determination priority, and to determine the type of the animal in the image. According to this device, by raising a determination priority with respect to a caution target animal set for a region where a vehicle is positioned to perform pattern recognition, pattern recognition of an animal with a high possibility of being present in the periphery of a vehicle is performed at an early stage. Thus, it is possible to rapidly perform animal type determination.

According to another aspect of an exemplary embodiment, a method of performing vehicle assistance control includes: capturing an image of a periphery of a vehicle; performing pattern recognition with respect to the image of the periphery of the vehicle using a plurality of pre-stored animal image patterns to determine a type of an animal in the image, wherein the performing the pattern recognition includes: acquiring information about a caution target animal; raising a determination priority of an animal image pattern of the plurality of pre-stored animal image patterns corresponding to the caution target animal; and performing the pattern recognition using the plurality of pre-stored animal image patterns in order of the determination priority; determining the type of the animal in the image based on one or more of the plurality of pre-stored animal image patterns; and performing vehicle assistance control based on the determined type of the animal in the image.

The capturing the image of the periphery of the vehicle may include capturing the image using at least one of a monocular camera and a stereo camera. The capturing the image of the periphery of the vehicle may further include detecting an object in the image of the periphery of the vehicle using at least one of a radio wave sensor and a LIDAR sensor.

The acquiring the information about the caution target animal may include: determining that an animal warning sign is present in the image of the periphery of the vehicle; and performing pattern recognition with respect to the animal warning sign using the plurality of pre-stored animal image patterns to determine the caution target animal.

The plurality of pre-stored animal image patterns may include a plurality of images corresponding to each animal image pattern. The plurality of images corresponding to each animal image pattern may include an outline image. The raising the determination priority of the animal image pattern of the plurality of pre-stored animal image patterns corresponding to the caution target animal may include raising the determination priority of the animal image pattern of the plurality of pre-stored animal image patterns corresponding to the caution target animal to the highest determination priority.

The acquiring information about the caution target animal may include: acquiring position information of the vehicle; and retrieving regional animal information corresponding to the position information of the vehicle, the regional animal information including the caution target animal.

The capturing the image of the periphery of the vehicle may include capturing the image using at least one of a monocular camera and a stereo camera. The capturing the image of the periphery of the vehicle further include detecting an object in the image of the periphery of the vehicle using at least one of a radio wave sensor and a LIDAR sensor.

The acquiring position information of the vehicle may include acquiring position information of the vehicle using a global positioning system (GPS) receiver.

The plurality of pre-stored animal image patterns may include a plurality of images corresponding to each animal image pattern. The plurality of images corresponding to each animal image pattern may include an outline image. The raising the determination priority of the animal image pattern of the plurality of pre-stored animal image patterns corresponding to the caution target animal may include raising the determination priority of the animal image pattern of the plurality of pre-stored animal image patterns corresponding to the caution target animal to the highest determination priority.

According to an exemplary embodiment, it is possible to rapidly perform animal type determination.

BRIEF DESCRIPTION OF THE DRAWINGS

FIG. 1 is a block diagram illustrating a schematic configuration of a collision avoidance assistance apparatus that includes an animal type determination device according to a first exemplary embodiment.

FIG. 3 is a flowchart illustrating a determination priority updating process in the animal type determination device shown in FIG. 1.

DETAILED DESCRIPTION

Figure 2A:
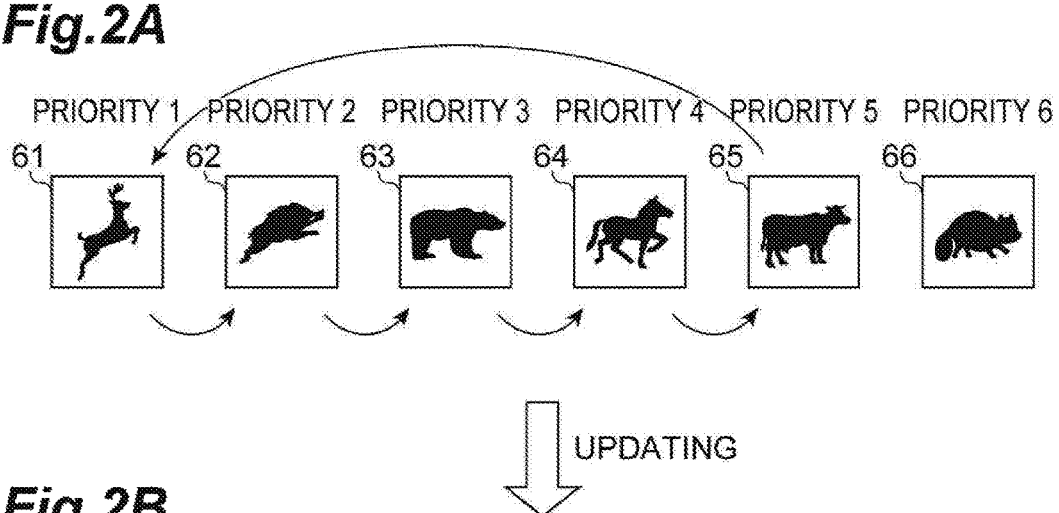
FIG. 2A and FIG. 2B are diagrams illustrating determination priorities of animal image patterns used in animal type determination in the animal type determination device shown in FIG. 1.

Hereinafter, aspects of exemplary embodiments will be described with reference to the accompanying drawings. Hereinafter, the same reference numerals are given to the same and corresponding components, and description thereof will not be repeated.

First Embodiment

FIG. 1 is a block diagram illustrating a schematic configuration of a collision avoidance assistance apparatus that includes an animal type determination device according to a first exemplary embodiment. A collision avoidance assistance apparatus 100 is an apparatus that is mounted in a vehicle and performs driving assistance with respect to a driver of the vehicle so as to avoid collision between the vehicle and an animal in the periphery of the vehicle. In this embodiment, the collision avoidance assistance apparatus 100 includes an animal type determination device 1. The animal type determination device 1 is a device that is mounted in the vehicle and determines the type of an animal (kind of an animal) in the periphery (surrounding) of the vehicle. Here, the category of animal does not include a human being, such as a pedestrian.

The collision avoidance assistance apparatus 100 includes an electric control unit (ECU) 10. The ECU 10 is an electronic control unit, and is configured to include a computer that includes a central processing unit (CPU), a read only memory (ROM), and a random access memory (RAM) as main components. Details of the ECU 10 will be described later.

A vehicle external information sensor 2, a global positioning system (GPS) receiver 3, a vehicle internal information sensor 4, a map database 5, a human machine interface (HMI) 7, and an actuator 8 are respectively connected to the ECU 10.

The vehicle external information sensor 2 is a detector that detects external states that correspond to peripheral information around the vehicle. The vehicle external information sensor 2 includes an imaging unit 21, and includes at least one of a radar sensor and a laser imaging detection and ranging (LIDAR) sensor.

The imaging unit 21 is an imaging device that image-captures the periphery of the vehicle, i.e., the peripheral area around the vehicle, and outputs information about the captured image to the ECU 10. The imaging unit 21 is provided on a rear side of a front glass of the vehicle, for example. A camera is used as the imaging unit 21, and a monocular camera or a stereo camera may be used as the camera. The stereo camera includes two imaging units arranged to reproduce binocular parallax. Information about image captured by the stereo camera also includes information about a depth direction. In a case where the stereo camera is used as the imaging unit 21, the imaging unit 21 functions as a detector that detects a three-dimensional object including a preceding vehicle, an obstacle, a pedestrian, or the like.

The radar sensor detects an object in the periphery of the vehicle using a radio wave (a millimeter wave). The radar sensor transmits a radio wave to the periphery of the vehicle and receives the radio wave reflected from an object, to thereby detect the object. The radar sensor outputs information about the detected object to the ECU 10.

The LIDAR sensor detects an object in the periphery of the vehicle using light. The LIDAR sensor transmits light to the periphery of the vehicle and receives the light reflected from an object, to thereby measure a distance to a reflection point and detect the object. The LIDAR sensor outputs information about the detected object to the ECU 10. It is not necessary that the LIDAR sensor and the radar sensor are provided together.

The vehicle internal information sensor 4 is a detection device that detects a travel state of the vehicle. The vehicle interior information sensor 4 includes a vehicle speed sensor. The vehicle sensor is a detector that detects the speed of the vehicle. As the vehicle speed sensor, a wheel speed sensor that is provided to a member such as a wheel of the vehicle or a drive shaft that rotates integrally with the wheel or rotates in synchronization with the wheel and detects a rotational speed of the vehicle is used. The vehicle speed sensor outputs information about the detected vehicle speed (wheel speed information) to the ECU 10.

The vehicle internal information sensor 4 may include at least one of an acceleration sensor and a yaw rate sensor. The acceleration sensor is a detector that detects an acceleration of the vehicle. The acceleration sensor includes a longitudinal acceleration sensor that detects an acceleration in a longitudinal direction of the vehicle, and a lateral acceleration sensor that detects a lateral acceleration of the vehicle, for example. The acceleration sensor outputs information about the acceleration of the vehicle to the ECU 10, for example. The yaw rate sensor is a detector that detects a yaw rate (rotational angular velocity) around a vertical axis of the center of the vehicle. As the yaw rate sensor, a gyro sensor may be used, for example. The yaw rate sensor outputs information about the detected yaw rate of the vehicle to the ECU 10.

The map database 5 is a database that includes map information. The map database is formed in a hard disk drive (HDD) mounted in the vehicle, for example. The map information includes road position information, road shape information (for example, types of curves and linear portions, curvatures of the curves, or the like), and position information about intersections and junctions, for example. The map database may be stored in a computer in a facility such as an information processing center which can communicate with the vehicle.

The HMI 7 is an interface that performs output and input of information between a passenger (including a driver) of the vehicle and the animal type determination device 1. The HMI 7 includes a monitor or a display panel for displaying image information to the passenger, a speaker for sound output, and an operating button, a touch panel or the like for an input operation of the passenger, for example. The HMI 7 may perform output of information to the passenger using a portable information terminal connected in a wireless manner, or may receive an input operation of the passenger using the portable information terminal.

The actuator 8 is a device that executes a vehicle control. The actuator 8 at least includes a throttle actuator, a brake actuator, and a steering actuator. The throttle actuator controls the amount of supplied air (throttle opening degree) with respect to an engine according to a control signal from the ECU 10, to thereby control a driving force of the vehicle. The brake actuator controls a brake system according to a control signal from the ECU 10, to thereby control a braking force applied to wheels of the vehicle. As the brake system, for example, a hydraulic brake system may be used. The steering actuator controls driving of an assist motor that controls a steering torque in an electrical power steering system according to a control signal from the ECU 10. Thus, the steering actuator adjusts an output of an assist torque with respect to a steering torque from a driver, for example, to thereby control the steering torque output to the vehicle. The steering actuator may control the steering torque output to the vehicle regardless of the steering torque from the driver.

The ECU 10 includes an external situation recognition unit 11, a travel state recognition unit 13, an animal candidate determination unit 14, an animal type determination unit 15, a sign recognition unit 16, a determination priority updating unit 17, and a collision avoidance control unit 18.

The external situation recognition unit 11 recognizes external situations of the vehicle based on detection results (for example, image information from the imaging unit 21, object information from the radar sensor, object information from the LIDAR, or the like) of the vehicle external information sensor 2. The external situations include, for example, a position of a white line in a travel lane with respect to the vehicle or a position of the center of the lane, a road width, a road shape (for example, a curvature of the travel lane, a gradient change of a road surface effective for perspective estimation of the vehicle external information sensor 2, a wave motion, or the like), and situations of an object in the periphery of the vehicle (for example, the distance from the object, the position of the object with respect to the vehicle, the movement direction of the object with respect to the vehicle, the relative speed of the object with respect to the vehicle, or the like). Furthermore, by collating the detection result of the vehicle external information sensor 2 with the map information, it is possible to enhance the accuracy of the position and direction of the vehicle acquired by the GPS receiver 3 or the like. The external situation recognition unit 11 functions as an object detection unit that detects the object in the periphery of the vehicle. The object includes, for example, an animal, another vehicle (including an automatic bicycle), a pedestrian, a bicycle, an obstacle, or the like.

The travel state recognition unit 13 recognizes travel states of the vehicle based on the detection results (for example, vehicle speed information from the vehicle sensor, acceleration information from the acceleration sensor, yaw rate information from the yaw rate sensor, or the like) of the vehicle internal information sensor 4. The travel states of the vehicle include vehicle speed, acceleration, and a yaw rate, for example. Furthermore, the travel state recognition unit 13 may recognize the travel direction of the vehicle based on a temporal change in the position of the vehicle.

The animal candidate determination unit 14 determines whether or not there is an animal candidate in an image captured by the imaging unit 21. For example, the animal candidate determination unit 14 performs a detection process for an animal candidate in the image by a known method using animal candidate image patterns. The animal candidate image patterns are image patterns for detection of animal candidates, and for example, include patterns which are set (stored) in the ECU 10 in advance. The animal candidate is a candidate (object) which is a target of animal type determination in an image. The animal candidate determination unit 14 may detect an animal candidate in an image by a known method without using the animal candidate image patterns. In a case where an object included in an image is detected by a known method based on information about an object detected by the radar sensor, the animal candidate determination unit 14 may detect the object as an animal candidate.

The animal type determination unit 15 performs pattern recognition using each animal image pattern which is set in advance for each type of animal with respect to an image captured by the imaging unit 21, to thereby determine the type of an animal in the image. The animal image patterns are image patterns for specifying the types of animals, and patterns that are set (stored) in advance in the ECU 10 according to the types of animals to be determined are used as the animal image patterns. The animal image pattern is prepared for each type of animal. In the type of each animal, an animal image pattern for each direction (a front surface, a rear surface, a left side surface, a right side surface, or the like) of the animal may be prepared. The animal image pattern includes information about an outline of the animal, for example. The animal image pattern may be an animal image, for example. Plural animal image patterns and determination priorities thereof are set (stored) in the ECU 10 in association. The determination priority of the animal image patterns means an order in which pattern recognition is performed in the animal type determination process. For example, as a value of the determination priority is smaller, the pattern recognition is performed earlier. The animal type determination unit 15 performs pattern recognition according to the order of determination priorities using the plural animal image patterns with respect to an image region of an animal candidate determined by the animal candidate determination unit 14, for example. The pattern recognition method may use a known method.

The sign recognition unit 16 recognizes, based on an image captured by the imaging unit 21, the type of a caution target animal indicated by an animal warning sign in the image. For example, the sign recognition unit 16 performs image processing with respect to the image captured by the imaging unit 21, and detects the animal warning sign in the image. The sign recognition unit 16 performs image processing with respect to the image including the detected animal warning sign, and recognizes the type of the caution target animal indicated by a figure or characters in the animal warning sign. The animal warning sign refers to a road sign that warns a person or calls a person's attention to the risk of animals running into a road. The animal warning signs include various types of road signs according to the types of animals for which a caution is to be issued. For example, there are animal warning signs for caution target animals such as deer, wild boar, bear, horse, cattle, or raccoon dog. The sign recognition unit 16 detects an animal warning sign in the image using a caution animal image pattern corresponding to the type of a caution target animal, and recognizes the type of the caution target animal shown in the animal warning sign. The caution animal image pattern is an image pattern for detecting an animal warning sign or for recognizing the type of the caution target animal shown in the animal caution sign. A pattern which is set (stored) in the ECU 10 is used as the caution animal image pattern. The caution animal image pattern may be respectively set according to the type of the animal shown in the animal warning sign.

In a case where the type of the caution target animal is recognized by the sign recognition unit 16, the determination priority updating unit 17 raises a determination priority of an animal image pattern corresponding to the type of the caution target animal. On the other hand, in a case where the type of the caution target animal is not recognized by the sign recognition unit 16, the determination priority updating unit 17 does not change the determination priority of the animal image pattern.

Figure 2B:
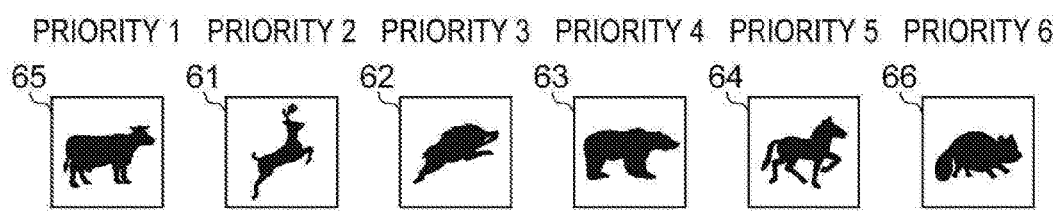

FIGS. 2A and 2B are diagrams illustrating determination priorities of animal image patterns used in animal type determination in the animal type determination device shown in FIG. 1. For example, in a case where the type of an animal such as deer, wild boar, bear, horse, cattle, or raccoon dog is determined, as shown in FIG. 2A, the animal type determination unit 15 performs determination using a deer animal image pattern 61, a wild boar animal image pattern 62, a bear animal image pattern 63, a horse animal image pattern 64, a cattle animal image pattern 65, and a raccoon dog animal image pattern 66. The animal image patterns 61 to 66 in FIGS. 2A and 2B schematically show animal image patterns used in animal type determination. In FIG. 2A, determination priorities corresponding to the respective animal image patterns are shown. In this case, the animal type determination is performed in the order of the deer animal image pattern 61, the wild boar animal image pattern 62, the bear animal image pattern 63, the horse animal image pattern 64, the cattle animal image pattern 65, and the raccoon dog animal image pattern 66. The number of animal image patterns is not limited to six. The number of animal image patterns may be set according to the number of types of animals to be determined, and thus, may be equal to or smaller than five, or may be equal to or greater than seven.

Here, in a case where cattle is recognized as a caution target animal by the sign recognition unit 16, the determination priority of the cattle animal image pattern 65 corresponding to the type of the caution target animal is raised by the determination priority updating unit 17. As shown in FIG. 2B, the determination priority of the cattle animal image pattern 65 is raised to the highest rank, and the determination priorities of the animal image patterns 61 to 64 which are ranked high compared with the cattle animal image pattern 65 are lowered in rank one by one. As the determination priority of the cattle animal image pattern 65 is raised, in the animal type determination process, pattern recognition of cattle with a high possibility of being present in a current vehicle position is performed at an early stage. In FIGS. 2A and 2B, the determination priority of the cattle animal image pattern 65 recognized as the caution target animal is raised to the highest rank, but the determination priority may be raised to a higher rank by one step, or a higher rank by two or more steps. Even in this case, as the determination priority is raised, pattern recognition of cattle is performed at an early stage. In FIG. 2B, the order of determination priorities, that is, the order of the cattle animal image pattern 65, the deer animal image pattern 61, the wild boar animal image pattern 62, the bear animal image pattern 63, the horse animal image pattern 64, and the raccoon dog animal image pattern 66 is used to perform each pattern recognition. In this case, for example, in a case where it is determined that the animal candidate in the image is a deer in pattern recognition using the deer animal image pattern 61, the animal type determination unit 15 does not perform the subsequent pattern recognition, and terminates the animal type determination process.

In a case where there is a possibility that an animal in the periphery of a vehicle and the vehicle collide with each other, the collision avoidance control unit 18 performs a collision avoidance assistance control. The collision avoidance control unit 18 calculates a time-to-collision (TTC) with respect to a detected animal. The calculation of the TTC is performed by dividing a distance between a vehicle and an object by a relative speed, for example. The collision avoidance control unit 18 determines a possibility that the animal and the vehicle collide with each other based on the TTC. Furthermore, in a case where the possibility of the animal and the vehicle colliding with each other is determined, the collision avoidance control unit 18 performs notification for calling the attention of a driver of the vehicle to the animal, and executes a braking control or a steering control as necessary. For example, the collision avoidance control unit 18 outputs a control signal to the HMI 7, outputs a caution sound or a warning sound according to the type of the animal through a speaker of the HMI 7, and displays a warning message according to the type of the animal on a monitor of the HMI 7. Furthermore, the collision avoidance control unit 18 outputs a control signal to the actuator 8, and executes a braking control or a steering control according to the type of the animal to avoid collision with the animal. The collision avoidance control unit 18 determines whether or not it is necessary to avoid collision according to the type of the animal determined by the animal type determination. In a case where it is determined that it is necessary to avoid collision with respect to the animal, the collision avoidance control unit 18 may determine whether or not there is a possibility that the animal and the vehicle collide with each other.

The external situation recognition unit 11, the travel state recognition unit 13, the animal candidate determination unit 14, the animal type determination unit 15, the sign recognition unit 16, the determination priority updating unit 17 and the collision avoidance control unit 18 described above may be configured by introducing software or a program that causes the ECU 10 to realize respective functions. Furthermore, a part or all of the functions may be configured by individual electronic control units.

Hereinbefore, the collision avoidance assistance apparatus 100 is described, but the animal type determination device 1 according to this embodiment includes the vehicle external information sensor 2 (at least the imaging unit 21), the external situation recognition unit 11, the travel state recognition unit 13, the animal candidate determination unit 14, the animal type determination unit 15, the sign recognition unit 16, and the determination priority updating unit 17 among the components of the collision avoidance assistance apparatus 100. The animal type determination device 1 according to this embodiment does not need to include the travel state recognition unit 13.

Next, an operation of the animal type determination device 1 according to this embodiment will be described.

FIG. 3 is a flowchart illustrating a determination priority updating process in the animal type determination device 1 according to this embodiment. The flowchart shown in FIG. 3 is executed by the ECU 10 in a case where a collision avoidance assistance of a vehicle is started, for example.

First, as shown in step S10 (hereinafter, simply referred to as "S10", which is similarly applied to subsequent steps S), it is determined whether or not an animal warning sign is present on a road where a vehicle travels. For example, the sign recognition unit 16 detects (searches for) the animal warning sign with respect to an image captured by the imaging unit 21 to determine whether or not there is the animal warning sign. In a case where it is determined in S10 that the animal warning sign is not present on the road where the vehicle travels, the determination priority updating process in FIG. 3 is terminated.

On the other hand, in a case where it is determined in S10 that the animal warning sign is present on the road where the vehicle travels, an animal type recognition process is performed (S12). That is, the sign recognition unit 16 recognizes the type of a caution target animal shown in the animal warning sign. For example, the sign recognition unit 16 performs pattern recognition with respect to a region of an animal warning sign in an image using a caution animal image pattern indicating the caution target animal to recognize the type of the caution target animal.

Furthermore, the procedure proceeds to S14, and a determination priority updating process is performed. For example, in a case where the type of the caution target animal is recognized by the sign recognition unit 16, the determination priority updating unit 17 raises a determination priority of the animal image pattern corresponding to the type of the caution target animal. In a case where the determination priority of the recognized caution target animal is the highest rank, the determination priority updating unit 17 does not change the determination priority. In a case where the process in S14 is terminated, the determination priority updating process in FIG. 3 is terminated.

In a case where the processes of the flowchart are terminated, the ECU 10 repeats the processes from S10. In a case where the collision avoidance assistance of the vehicle is terminated, the ECU 10 does not repeat the processes from S10, even when the processes of the flowchart are terminated.

Figure 4:
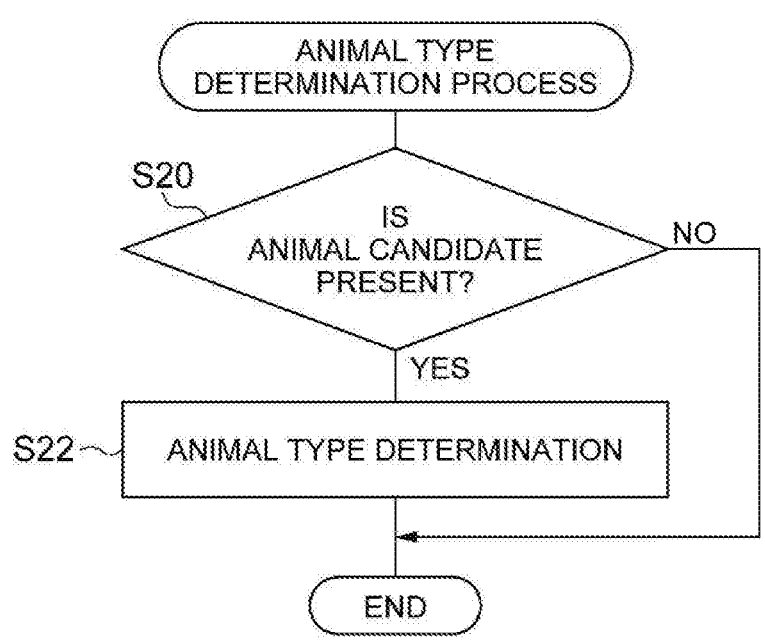
FIG. 4 is a flowchart illustrating an animal type determination process in the animal type determination device shown in FIG. 1.

FIG. 4 is a flowchart illustrating an animal type determination process in the animal type determination device 1 according to this embodiment. The flowchart shown in FIG. 4 is executed by the ECU 10 in a case where the collision avoidance assistance of the vehicle is started, for example.

First, as shown in S20, it is determined whether or not there is an animal candidate in an image obtained by capturing the periphery of the vehicle. That is, the animal candidate determination unit 14 determines whether or not there is an animal candidate in an image captured by the imaging unit 21. For example, the animal candidate determination unit 14 performs a detection process for an animal candidate in the image by a known method using animal candidate image patterns. In a case where it is determined in step S20 that there is no animal candidate in the image, the animal type determination process in FIG. 4 is terminated.

On the other hand, in a case where it is determined in S20 that there is an animal candidate in the image, the animal type determination process is performed (S22). That is, the animal type determination unit 15 performs pattern recognition using plural animal image patterns with respect to an image region of the animal candidate determined by the animal candidate determination process in S20, to thereby determine the type of an animal in the image.

For example, as shown in FIG. 2B, in a case where determination priorities are set as animal image patterns in the order of the cattle animal image pattern 65, the deer animal image pattern 61, the wild boar animal image pattern 62, the bear animal image pattern 63, the horse animal image pattern 64, and the raccoon dog animal image pattern 66, the animal type determination unit 15 performs the pattern recognition using the animal image patterns according to the determination priorities. In a case where the type of the animal in the image is determined, the animal type determination unit 15 does not perform the subsequent pattern recognition, and terminates the animal type determination process of S22. For example, in a case where it is determined that the animal candidate in the image in the pattern recognition using the cattle animal image pattern 65 is cattle, the animal type determination unit 15 does not perform the subsequent pattern recognition, and terminates the animal type determination process of S22.

In a case where the process of the flowchart is terminated, the ECU 10 repeats the processes from S20 again. The animal candidate of which the type of the animal is determined by the animal type determination process in S22 is excluded from a target of the animal type determination process which is repeated. In a case where the collision avoidance assistance of the vehicle is terminated, the ECU 10 does not repeat the processes from S20, even when the processes of the flowchart are terminated.

The collision avoidance control unit 18 performs a collision avoidance process according to the type of the animal determined by the animal type determination process shown in FIG. 4. For example, the collision avoidance control unit 18 outputs a control signal to the HMI 7, outputs a caution sound or a warning sound according to the type of the animal through the speaker of the HMI 7, and displays a warning message according to the type of the animal on the monitor of the HMI 7. Furthermore, the collision avoidance control unit 18 outputs a control signal to the actuator 8, and executes a braking control or a steering control according to the type of the animal to avoid collision with the animal.

As described above, according to the animal type determination device 1 according to this embodiment, by raising a determination priority with respect to a caution target animal shown in an animal warning sign to perform pattern recognition, pattern recognition of an animal which has a high possibility of being present in the periphery of a vehicle is performed at an early stage. Thus, it is possible to rapidly perform animal type determination.

Second Embodiment

Figure 5:
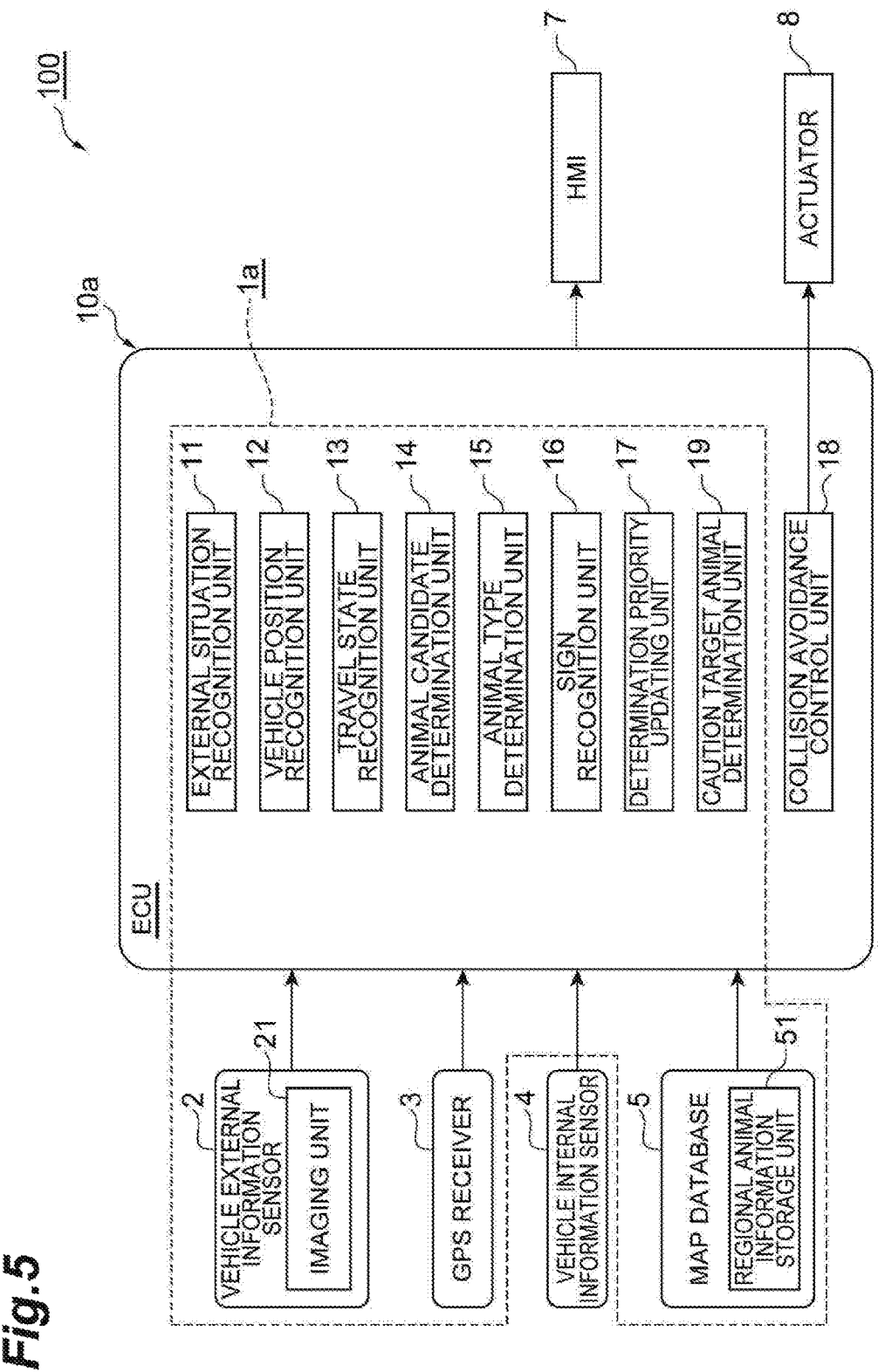
FIG. 5 is a block diagram illustrating a schematic configuration of an animal type determination device according to a second exemplary embodiment.

FIG. 5 is a block diagram illustrating a schematic configuration of an animal type determination device 1a according to a second exemplary embodiment. The animal type determination device 1a according to this embodiment is a device that is mounted in a vehicle and determines the type of an animal in the periphery of the vehicle. The animal type determination device 1a has almost the same configuration as that of the animal type determination device 1 according to the first embodiment. The animal type determination device 1a according to this embodiment is different from the animal type determination device 1 according to the first embodiment in which information about a caution target animal is acquired by image information about an animal warning sign in that information about a caution target animal is acquired based on a vehicle position information and information in a map database. In this embodiment, a case where the animal type determination device 1a is used as a device that determines the type of an animal in the collision avoidance assistance apparatus 100 will be described.

The vehicle external information sensor 2, the global positioning system (GPS) receiver 3, the vehicle internal information sensor 4, the map database 5, the HMI 7, and the actuator 8 are respectively connected to an ECU 10a. As the vehicle external information sensor 2 (including the imaging unit 21), the vehicle internal information sensor 4, the HMI 7, and the actuator 8, the same components described in the first embodiment may be used.

The GPS receiver 3 receives signals from three or more GPS satellites, to thereby measure a position of the vehicle (for example, latitude and longitude of the vehicle). The GPS receiver 3 transmits information about the measured position of the vehicle to the ECU 10a. Instead of the GPS receiver 3, a different technique capable of specifying the latitude and longitude of the vehicle may be used. Furthermore, it is preferable that the GPS receiver 3 or the different technique has a function of measuring a direction of the vehicle for collation between a measurement result of a sensor and map information (which will be described later).

The map database 5 includes a regional animal information storage unit 51. The regional animal information storage unit 51 stores regional animal information in which a caution target animal is associated with each of predetermined regions. For example, the regional animal information storage unit 51 sets a caution target animal for which a caution is to be issued in vehicle travel, for example, deer, cattle, or the like for each region, and stores regional animal information. According to regions, a caution target animal may not be stored, or two or more caution target animals may be stored. In a case where a vehicle travels in a region where a caution target animal is not stored, determination priorities of pattern recognition are not changed. Furthermore, in a case where a vehicle travels in a region where two or more caution target animals are stored, determination priorities of the caution target animals are respectively raised. In a case where two or more caution target animals are set for the same region, a determination priority of each caution target animal is determined in advance.

The ECU 10a includes the external situation recognition unit 11, a vehicle position recognition unit 12, the travel state recognition unit 13, the animal candidate determination unit 14, the animal type determination unit 15, the determination priority updating unit 17, the collision avoidance control unit 18, and a caution target animal determination unit 19. As the external situation recognition unit 11, the travel state recognition unit 13, the animal candidate determination unit 14, the animal type determination unit 15, and the collision avoidance control unit 18, the same components described in the first embodiment may be used.

The vehicle position recognition unit 12 recognizes a position of a vehicle on a map based on position information of the vehicle received by the GPS receiver 3 and map information in the map database 5. In a case where the vehicle position of the vehicle can be measured by a sensor that is provided at an external place such as a road, the vehicle position recognition unit 12 may acquire the vehicle position by communication from the sensor. The vehicle position recognition unit 12 functions as a position information acquisition unit that acquires the position information of the vehicle.

The caution target animal determination unit 19 determines whether or not a caution target animal is set for a region where a vehicle is currently positioned based on position information of the vehicle and regional animal information. For example, in a case where the caution target animal is set for the region where the vehicle is positioned in the regional animal information, the caution target animal determination unit 19 determines that the caution target animal is set for the region where the vehicle is currently positioned, and in a case where the caution target animal is not set for the region where the vehicle is positioned in the regional animal information, the caution target animal determination unit 19 determines that the caution target animal is not set for the region where the vehicle is currently positioned.

In a case where it is determined by the caution target animal determination unit 19 that the caution target animal is set for the region where the vehicle is positioned, the determination priority updating unit 17 raises a determination priority of an animal image pattern corresponding to the type of the caution target animal. On the other hand, in a case where it is determined by the caution target animal determination unit 19 that the caution target animal is not set for the region where the vehicle is positioned, the determination priority updating unit 17 does not change a determination priority of an animal image pattern.

The animal type determination device 1a according to this embodiment includes the vehicle external information sensor 2 (at least the imaging unit 21), the GPS receiver 3, the map database 5 (at least the regional animal information storage unit 51), the external situation recognition unit 11, the vehicle position recognition unit 12, the travel state recognition unit 13, the animal candidate determination unit 14, the animal type determination unit 15, a sign recognition unit 16, the determination priority updating unit 17, and the caution target animal determination unit 19 among the components of the collision avoidance assistance apparatus 100, for example. The animal type determination device 1a according to this embodiment may not include the travel state recognition unit 13.

Next, an operation of the animal type determination device 1a according to this embodiment will be described.

Figure 6:
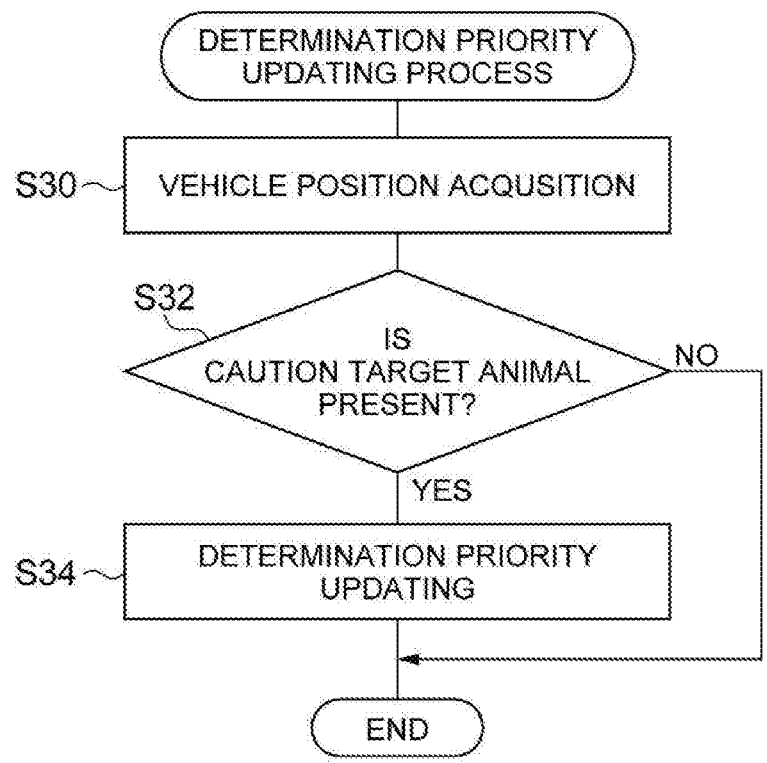
FIG. 6 is a flowchart illustrating a determination priority updating process in the animal type determination device shown in FIG. 5.

FIG. 6 is a flowchart illustrating a determination priority updating process in the operation of the animal type determination device 1a according to this embodiment. The determination priority updating process is executed by the ECU 10a in a case where a collision avoidance assistance of a vehicle is started, for example.

First, as shown in step S30, an acquisition process of vehicle position information is performed. For example, the vehicle position recognition unit 12 acquires vehicle position information on a map based on position information of a vehicle received by the GPS receiver 3 and map information in the map database 5.

Furthermore, the procedure proceeds to S32, and it is determined whether or not a caution target animal is set for a region where the vehicle is positioned. For example, the caution target animal determination unit 19 determines whether or not a caution target animal is set for a region where a vehicle is currently positioned based on position information of the vehicle and regional animal information. For example, in a case where the caution target animal is set for the region where the vehicle is positioned in the regional animal information, the caution target animal determination unit 19 determines that the caution target animal is set for the region where the vehicle is currently positioned, and in a case where the caution target animal is not set for the region where the vehicle is positioned in the regional animal information, the caution target animal determination unit 19 determines that the caution target animal is not set for the region where the vehicle is currently positioned. In a case where it is determined that the caution target animal is not set for the region where the vehicle is currently positioned in S32, it is determined that it is not necessary to change determination priorities of animal type determination, and the determination priority updating process in FIG. 6 is terminated.

On the other hand, in a case where it is determined that the caution target animal is set for the region where the vehicle is currently positioned in S32, the determination priority updating process is performed. For example, the determination priority updating unit 17 raises a determination priority of an animal image pattern corresponding to the type of the caution target animal set for the region where the vehicle is currently positioned. In a case where the determination priority of the caution target animal is the highest rank, the determination priority updating unit 17 does not change the determination priority. In a case where the process of S34 is terminated, the determination priority updating process in FIG. 6 is terminated.

In a case where the processes of the flowchart are terminated, the ECU 10a repeats the processes from S30 again. In a case where the collision avoidance assistance of the vehicle is terminated, the ECU 10a does not repeat the processes from S30, even when the processes of the flowchart are terminated.

As described above, according to the animal type determination device 1a according to this embodiment, by raising a determination priority with respect to a caution target animal set for a region where a vehicle is positioned to perform pattern recognition, pattern recognition of an animal with a high possibility of being present in the periphery of a vehicle is performed at an early stage. Thus, it is possible to rapidly perform animal type determination.

The above-described exemplary embodiments relate to an aspect of an animal type determination device, but the animal type determination device is not limited to the above-described embodiments. The animal type determination device may include various modifications and applications of the animal type determination devices of the above-described embodiments in a range without departing from the spirit of disclosures of respective claims.

For example, in the animal type determination device 1a according to the above-described second embodiment, the determination priority updating unit 17 may change determination priorities of animals in animal type determination according to seasons, time or weather. For example, the regional animal information storage unit 51 may store regional animal information in which a caution target animal is associated with season, distinction of day and night, time or weather in each region. The determination priority updating unit 17 recognizes a current season, distinction of day and night, or time from an internal timer of the ECU 10a, for example. The determination priority updating unit 17 raises a determination priority of an animal image pattern corresponding to the type of a caution target animal set with respect to a current season, distinction between day and night, or time in a region where a vehicle is currently positioned, based on regional animal information stored in the regional animal information storage unit 51. In this case, it is possible to perform appropriate animal type determination corresponding to an animal that appears according to seasons, appears during a distinct time of either day or night, or according to time or weather.

Furthermore, a case where the above-described animal type determination device 1 or 1a according to the embodiments is used in the collision avoidance assistance apparatus 100 is described, but the animal type determination device 1 or 1a may be applied to other apparatuses. The animal type determination device 1 or 1a may not be used for a collision avoidance assistance of a vehicle, and may be used for only a warning to a driver. Furthermore, the animal type determination device 1 or 1a may be used as an individual device.

What is claimed is:

1. An animal type determination device comprising:
a camera configured to be mounted in a vehicle and to capture an image of a periphery of the vehicle; and
a controller configured to:
  perform pattern recognition with respect to the image captured by the camera using a plurality of pre-stored animal image patterns and determine a type of an animal in the image;
  recognize a type of a caution target animal indicated by an animal warning sign in the image captured by the camera; and
  raise a determination priority of an animal image pattern corresponding to the type of the caution target animal in response to the type of the caution target animal being recognized,
wherein the controller is further configured to perform the pattern recognition using the plurality of pre-stored animal image patterns in the order of the determination priority, and to determine the type of the animal in the image.

2. An animal type determination device comprising:
a camera configured to be mounted in a vehicle and to capture an image of a periphery of the vehicle; and
a controller configured to:
  perform pattern recognition with respect to the image captured by the camera using a plurality of pre-stored animal image patterns and determine a type of an animal in the image;
  acquire position information of the vehicle;
  retrieve regional animal information corresponding to the position information of the vehicle from a memory, in which a caution target animal is associated with each of a plurality of predetermined regions;

determine whether or not the caution target animal is set for a region where the vehicle is positioned based on the position information of the vehicle and the regional animal information; and raise a determination priority of an animal image pattern corresponding to a type of the caution target animal in response to determining that the caution target animal is set for the region where the vehicle is located, wherein the controller is further configured to perform the pattern recognition using the plurality of pre-stored animal image patterns in the order of the determination priority, and to determine the type of the animal in the image.

3. A method of performing vehicle assistance control, comprising:

capturing an image of a periphery of a vehicle;

performing pattern recognition with respect to the image of the periphery of the vehicle using a plurality of pre-stored animal image patterns to determine a type of an animal in the image, wherein the performing the pattern recognition comprises:

acquiring information about a caution target animal;

raising a determination priority of an animal image pattern of the plurality of pre-stored animal image patterns corresponding to the caution target animal; and performing the pattern recognition using the plurality of pre-stored animal image patterns in order of the determination priority;

determining the type of the animal in the image based on one or more of the plurality of pre-stored animal image patterns; and performing vehicle assistance control based on the determined type of the animal in the image.

4. The method of performing vehicle assistance control of claim 3, wherein the capturing the image of the periphery of the vehicle comprises capturing the image using at least one of a monocular camera and a stereo camera.

5. The method of performing vehicle assistance control according to claim 4, wherein the capturing the image of the periphery of the vehicle further comprises detecting an object in the image of the periphery of the vehicle using at least one of a radio wave sensor and a LIDAR sensor.

6. The method of performing vehicle assistance control of claim 3, wherein the acquiring the information about the caution target animal comprises:

determining that an animal warning sign is present in the image of the periphery of the vehicle; and performing pattern recognition with respect to the animal warning sign using the plurality of pre-stored animal image patterns to determine the caution target animal.

7. The method of performing vehicle assistance control according to claim 6, wherein the plurality of pre-stored animal image patterns comprises a plurality of images corresponding to each animal image pattern.

8. The method of performing vehicle assistance control according to claim 7, wherein the plurality of images corresponding to each animal image pattern comprises an outline image.

9. The method of performing vehicle assistance control of claim 3, wherein the raising the determination priority of the animal image pattern of the plurality of pre-stored animal image patterns corresponding to the caution target animal comprises raising the determination priority of the animal image pattern of the plurality of pre-stored animal image patterns corresponding to the caution target animal to the highest determination priority.

10. The method of performing vehicle assistance control of claim 3, wherein the acquiring information about the caution target animal comprises:

acquiring position information of the vehicle; and retrieving regional animal information corresponding to the position information of the vehicle, the regional animal information comprising the caution target animal.

11. The method of performing vehicle assistance control of claim 10, wherein the capturing the image of the periphery of the vehicle comprises capturing the image using at least one of a monocular camera and a stereo camera.

12. The method of performing vehicle assistance control according to claim 11, wherein the capturing the image of the periphery of the vehicle further comprises detecting an object in the image of the periphery of the vehicle using at least one of a radio wave sensor and a LIDAR sensor.

13. The method of performing vehicle assistance control of claim 10, wherein the acquiring position information of the vehicle comprises acquiring position information of the vehicle using a global positioning system (GPS) receiver.

14. The method of performing vehicle assistance control according to claim 10, wherein the plurality of pre-stored animal image patterns comprises a plurality of images corresponding to each animal image pattern.

15. The method of performing vehicle assistance control according to claim 14, wherein the plurality of images corresponding to each animal image pattern comprises an outline image.

16. The method of performing vehicle assistance control of claim 10, wherein the raising the determination priority of the animal image pattern of the plurality of pre-stored animal image patterns corresponding to the caution target animal comprises raising the determination priority of the animal image pattern of the plurality of pre-stored animal image patterns corresponding to the caution target animal to the highest determination priority.

* * * * *